(12) United States Patent
South

(10) Patent No.: US 9,115,515 B1
(45) Date of Patent: Aug. 25, 2015

(54) ELECTRONIC DEVICE STORAGE ASSEMBLY

(71) Applicant: Robert W. South, Oakville (CA)

(72) Inventor: Robert W. South, Oakville (CA)

( * ) Notice: Subject to any disclaimer, the term of this patent is extended or adjusted under 35 U.S.C. 154(b) by 0 days.

(21) Appl. No.: 14/450,669

(22) Filed: Aug. 4, 2014

(51) Int. Cl.
*B60R 7/04* (2006.01)
*E05B 77/54* (2014.01)
*B60R 11/02* (2006.01)

(52) U.S. Cl.
CPC . *E05B 77/54* (2013.01); *B60R 7/04* (2013.01); *B60R 11/0241* (2013.01)

(58) Field of Classification Search
CPC ........... B60R 25/32; B60R 7/04; E05B 77/54; E05B 65/0075
USPC .................... 296/37.14, 37.8, 37.15
See application file for complete search history.

(56) References Cited

U.S. PATENT DOCUMENTS

| | | | |
|---|---|---|---|
| 4,051,790 A | 10/1977 | Meditz et al. | |
| 4,087,126 A | 5/1978 | Wynn | |
| 4,684,164 A | 8/1987 | Durham | |
| 4,926,762 A | 5/1990 | Paul | |
| 5,239,849 A | 8/1993 | Gallardo | |
| 5,778,805 A * | 7/1998 | Green | 109/51 |
| 6,164,219 A * | 12/2000 | Green | 109/73 |
| 6,176,534 B1 * | 1/2001 | Duncan | 296/37.12 |
| 6,422,614 B1 * | 7/2002 | Kuntz et al. | 292/144 |
| 6,741,166 B1 * | 5/2004 | Sanchez | 340/426.34 |
| 6,783,167 B2 | 8/2004 | Koops et al. | |
| 6,832,799 B2 * | 12/2004 | Haspel et al. | 296/37.16 |
| 6,929,304 B1 * | 8/2005 | Dry et al. | 296/37.8 |
| 7,183,903 B2 * | 2/2007 | Nicolson et al. | 340/426.36 |
| 7,413,229 B2 * | 8/2008 | Kukucka et al. | 296/24.34 |
| 7,469,951 B2 * | 12/2008 | Welschholz et al. | 296/37.8 |
| 7,604,291 B2 * | 10/2009 | Vitito | 297/188.19 |
| 8,020,416 B2 | 9/2011 | Talmage et al. | |
| 8,172,293 B2 * | 5/2012 | Lota et al. | 296/24.34 |
| 8,233,269 B2 * | 7/2012 | Hotary et al. | 361/679.01 |
| 8,303,016 B2 * | 11/2012 | Pauken et al. | 296/37.8 |
| 8,528,956 B1 * | 9/2013 | Winiger et al. | 296/24.34 |
| 8,854,180 B2 * | 10/2014 | Bacarella | 340/5.6 |
| 8,996,081 B2 * | 3/2015 | Lachnitt et al. | 455/575.7 |
| 2006/0097536 A1 * | 5/2006 | DePue et al. | 296/37.8 |
| 2007/0262600 A1 * | 11/2007 | Chen | 296/37.8 |
| 2011/0272959 A1 * | 11/2011 | Lupton et al. | 296/37.8 |
| 2015/0052958 A1 * | 2/2015 | Pericak et al. | 70/258 |

FOREIGN PATENT DOCUMENTS

| | | |
|---|---|---|
| CN | 201627477 U | 11/2010 |
| CN | 202053960 U | 11/2011 |

* cited by examiner

*Primary Examiner* — Pinel Romain

(57) ABSTRACT

A electronic device storage assembly includes a housing that may be positioned within a vehicle. A drawer is movably coupled to the housing. The drawer insertably receives an electronic device. The electronic device is contained within the housing. A lock is coupled to the drawer. The lock is operationally coupled to the vehicle. The lock detects when the vehicle is driven. The lock selectively locks the drawer so the electronic device is not accessible while the vehicle is driven.

12 Claims, 5 Drawing Sheets

ELECTRONIC DEVICE STORAGE ASSEMBLY

BACKGROUND OF THE DISCLOSURE

Field of the Disclosure

The disclosure relates to storage devices and more particularly pertains to a new storage device for preventing texting while driving.

SUMMARY OF THE DISCLOSURE

An embodiment of the disclosure meets the needs presented above by generally comprising a housing that may be positioned within a vehicle. A drawer is movably coupled to the housing. The drawer insertably receives an electronic device. The electronic device is contained within the housing. A lock is coupled to the drawer. The lock is operationally coupled to the vehicle. The lock detects when the vehicle is driven. The lock selectively locks the drawer so the electronic device is not accessible while the vehicle is driven.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
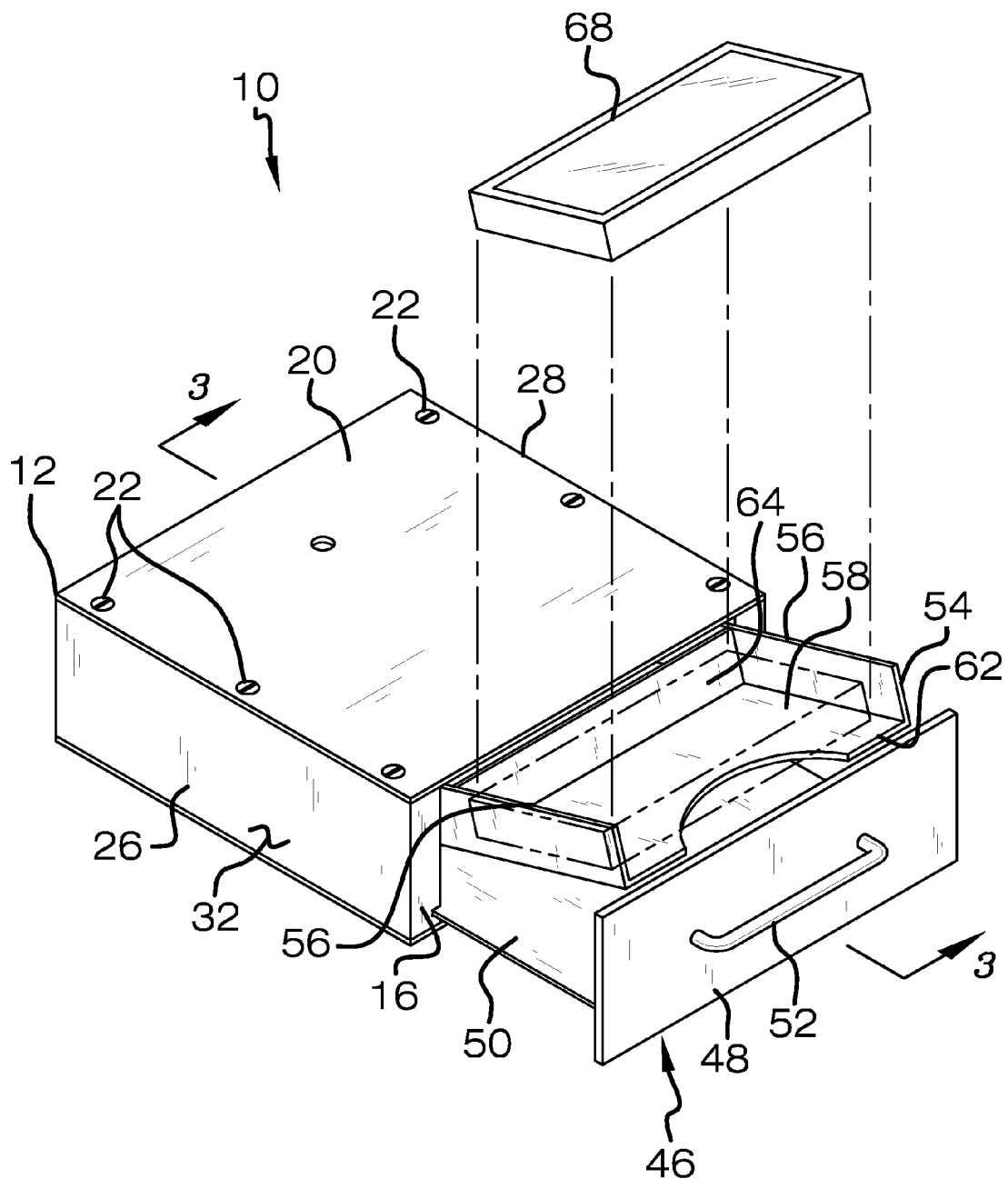
FIG. 1 is a top perspective view of a electronic device storage assembly according to an embodiment of the disclosure.
Figure 2:
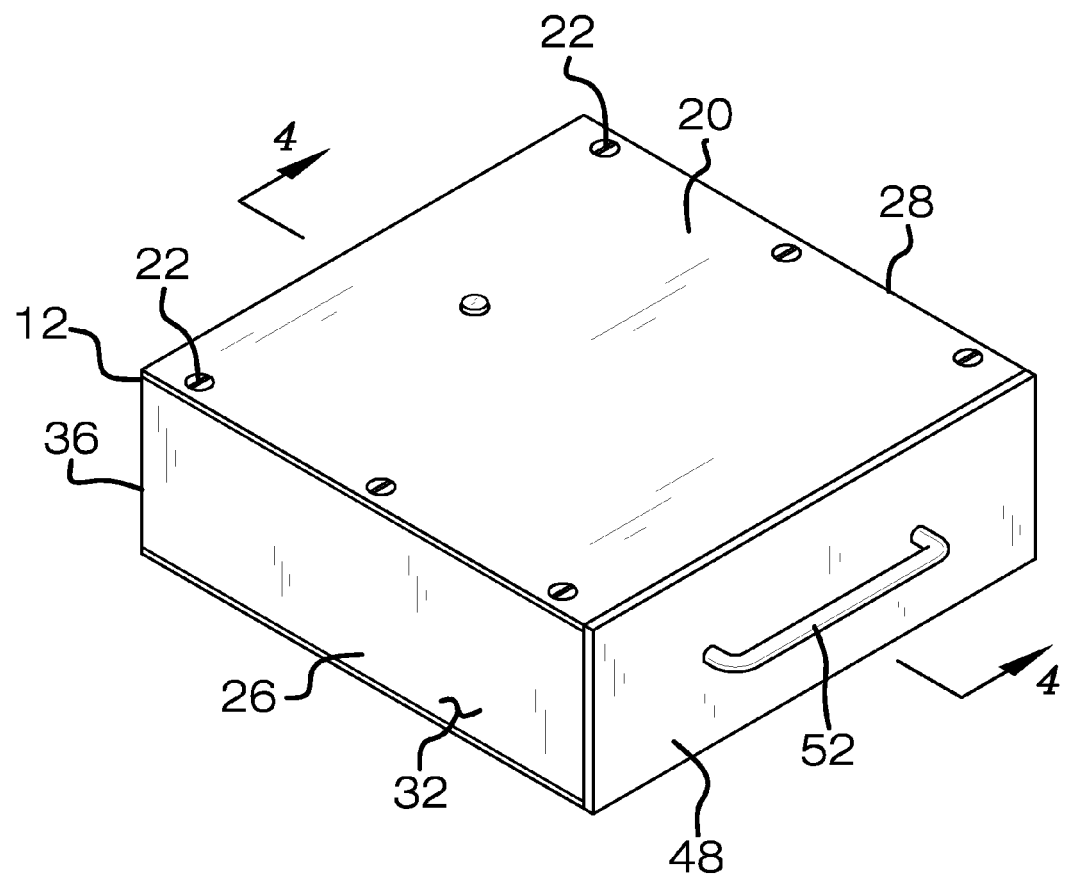
FIG. 2 is a perspective view of an embodiment of the disclosure.
Figure 3:
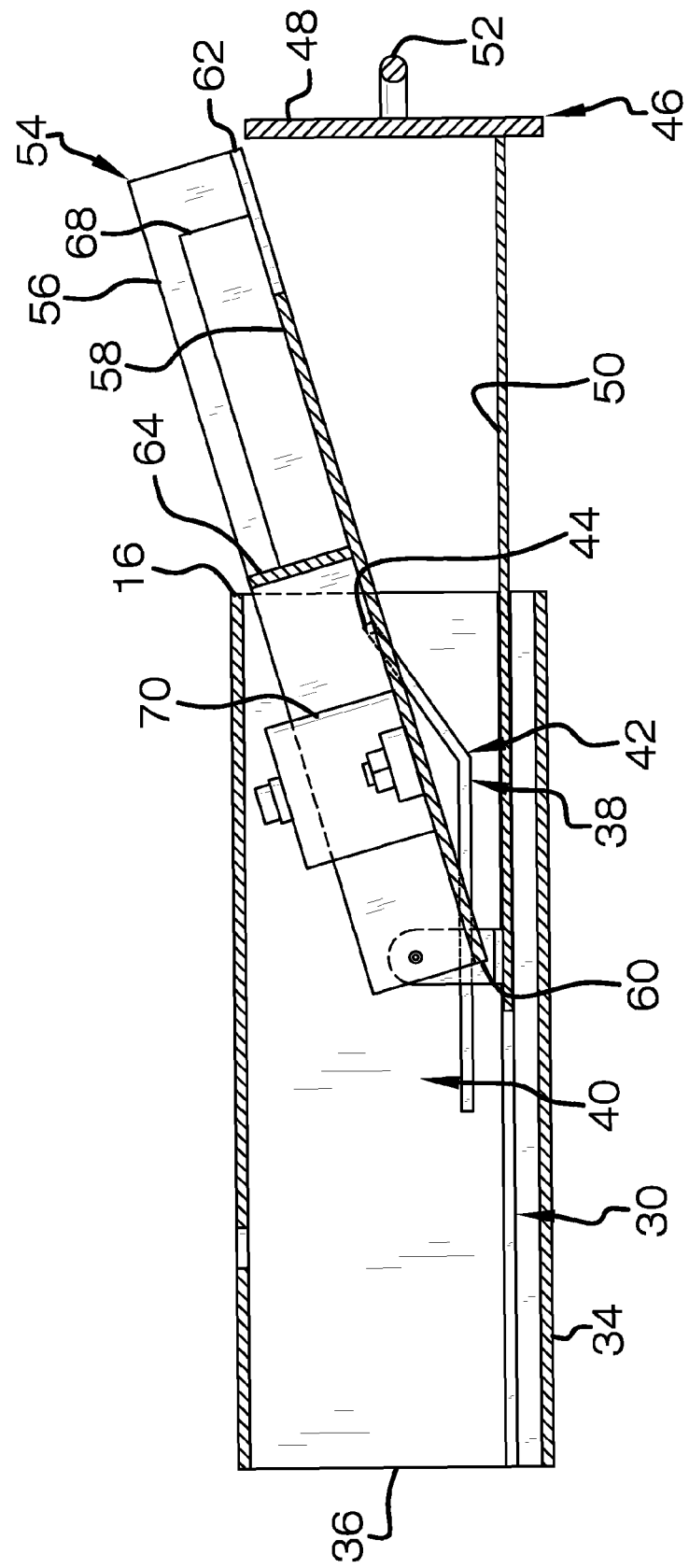
FIG. 3 is a cross sectional view taken along line 3-3 of FIG. 1 of an embodiment of the disclosure.
Figure 4:
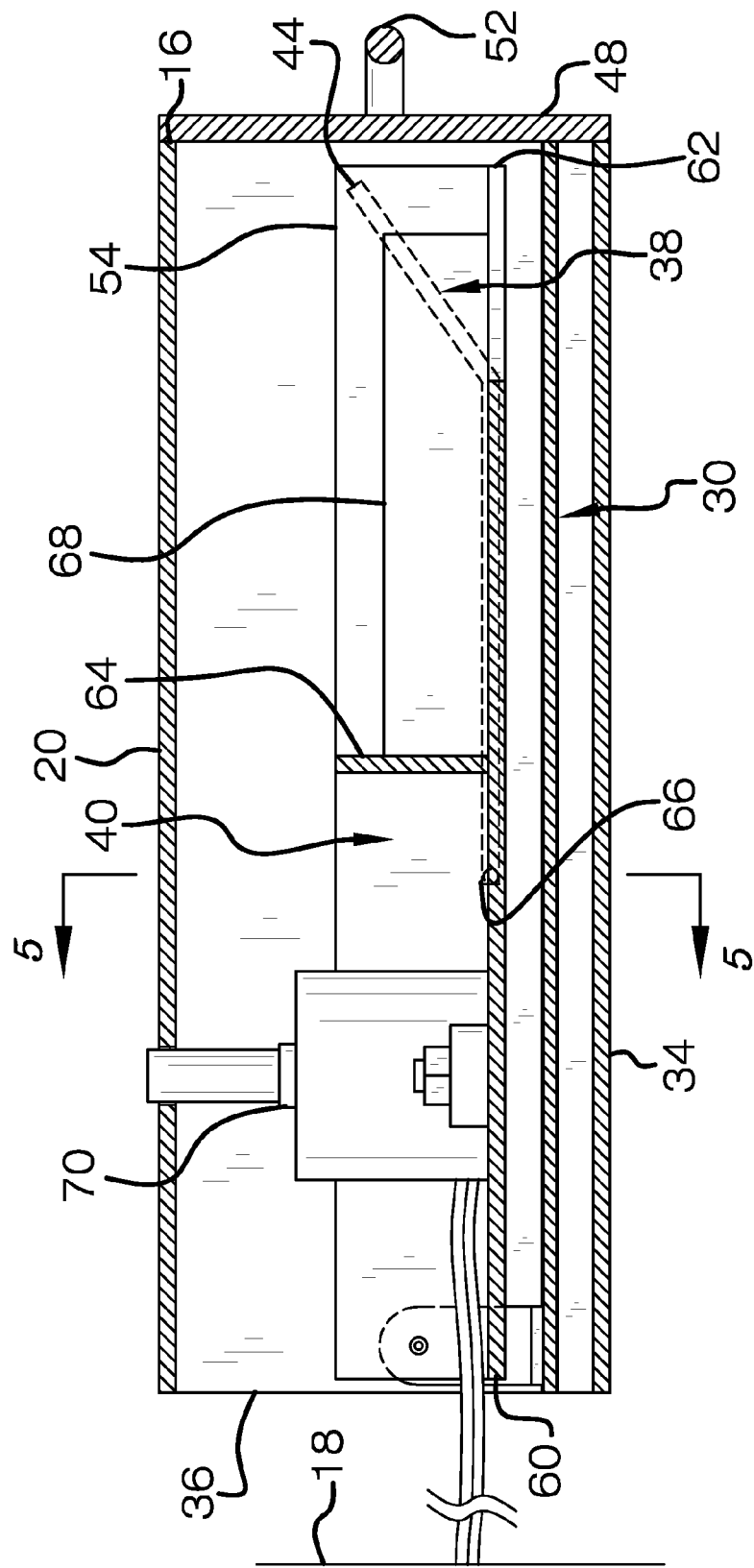
FIG. 4 is a cross sectional view taken along line 4-4 of FIG. 2 of an embodiment of the disclosure.
Figure 5:
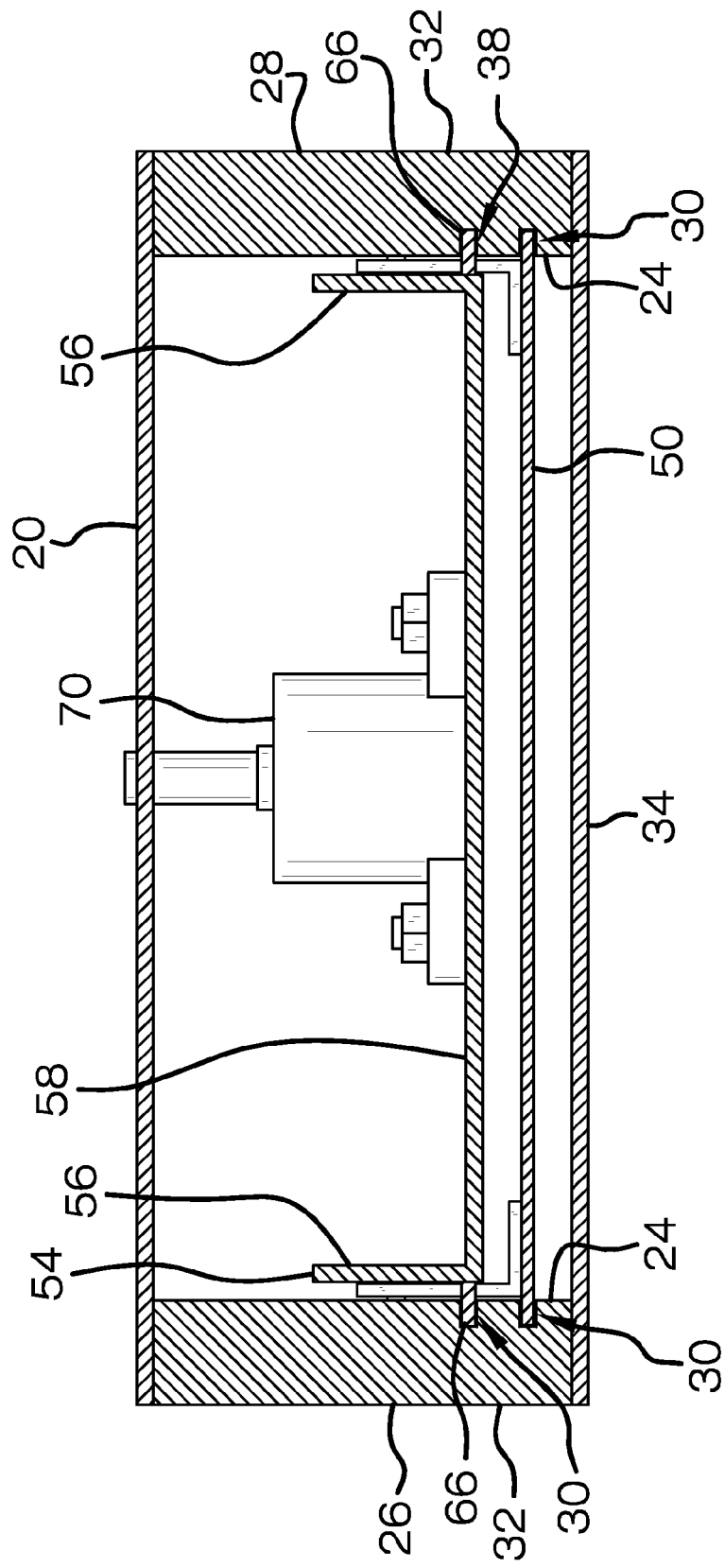
FIG. 5 is a cross sectional view taken along line 5-5 of FIG. 4 of an embodiment of the disclosure.

With reference now to the drawings, and in particular to FIGS. 1 through 5 thereof, a new storage device embodying the principles and concepts of an embodiment of the disclosure and generally designated by the reference numeral 10 will be described.

As best illustrated in FIGS. 1 through 5, the electronic device storage assembly 10 generally comprises a housing 12. The housing 12 has a perimeter wall 14. The perimeter wall 14 of the housing 12 is structured so a front side 16 of the housing 12 is open. The housing 12 may be positioned within a vehicle 18.

A top wall 20 of the housing 12 is removably coupled to the perimeter wall 14 of the housing 12. A plurality of screws 22 extends downwardly through the top wall 20 of the housing 12 and engages the perimeter wall 14 of the housing 12. The plurality of screws 22 retains the top wall 20 of the housing 12 on the perimeter wall 14 of the housing 12.

An inner surface 24 of each of a first lateral side 26 and a second lateral side 28 of the perimeter wall 14 of the housing 12 each has a drawer groove 30 extending toward and outer surface 32 of the perimeter wall 14 of the housing 12. The drawer grooves 30 are each positioned proximate to and are coextensive with a bottom wall 34 of the housing 12. Additionally, the drawer grooves 30 each extends between a back side 36 of the housing 12 and the front side 16 of the housing 12.

The inner surface 24 of each of the first 26 and second 28 lateral sides of the perimeter wall 14 of the housing 12 each has a pin groove 38 extending toward the outer surface 32 of the perimeter wall 14 of the housing 12. The pin grooves 38 are each positioned above and are coextensive with an associated one of the drawer grooves 30. Moreover, the pin grooves 38 each extends between a center 40 of the housing and the front side 16 of the housing 12. The pin grooves 38 each angle upwardly proximate a middle 42 of the pin grooves 38. A front end 44 of the pin grooves 38 is positioned proximate the top wall 20 of the housing 12.

A drawer 46 is provided. The drawer 46 has a forward wall 48 coupled to a basal wall 50 of the drawer 46. The basal wall 50 of the drawer 46 slidably engages each of the drawer grooves 30. The drawer 46 is slidable outwardly from the front side 16 of the housing 12. A handle 52 is coupled to the forward wall 48 of the drawer 46. The handle 52 may be gripped.

A tray 54 is provided. The tray 54 has a pair of oblique walls 56 extending upwardly from a lowermost wall 58 of the tray 54. The pair of oblique walls 56 of the ray 54 are laterally spaced apart from each other. The tray 54 has a rear end 60 and a front end 62. Additionally, the rear end 60 of the tray 54 is hingedly coupled to the basal wall 50 of the drawer 46 so the tray 54 is positioned above the drawer 46.

A partition 64 is coupled to an extends upwardly from the lowermost wall 58 of the tray 54. The partition 64 is centrally positioned on the tray 54. Additionally, the partition 624 extends between each of the pair of oblique walls 56 of the tray 54. A pair of pins 66 is each coupled to and extends laterally away from an associated one of the oblique walls 56 of the tray 54. Each of the pins 66 is centrally positioned on the tray 54.

The pair of pins 66 each slidably engages an associated one of the pin grooves 38. The front end 62 of the tray 54 is raised upwardly from the drawer 46 when the drawer 46 is slid outwardly from the housing 12. Moreover, the tray 54 may insertably receive an electronic device 68. The electronic device 68 is positionable between the partition 64 and the front end 62 of the tray 54. The electronic device 68 may be a smart phone of any conventional design. The front end 62 of the tray 54 is lowered downwardly toward the drawer 46 when the drawer 46 is slid inwardly into the housing 12 so the electronic device 68 is contained within the housing 12.

A lock 70 is coupled to and extends upwardly from the lowermost wall 58 of the tray 54. The lock 70 is positioned between the partition 64 and the rear end 60 of the tray 54. Additionally, the lock 70 is electrically coupled to the vehicle 18. The lock 70 is actuated when the vehicle 18 is driven. The electronic device 68 is removable from the tray 54 when the drawer 46 is unlocked.

The lock 70 engages the top wall 20 of the housing 12 when the drawer 46 is slid inwardly into the housing 12. Additionally, the lock 70 engages the top wall 20 of the housing 12 when the vehicle 18 is driven. The drawer 46 is locked in a closed position so the electronic device 68 is not accessible when the vehicle 18 is driven. The lock 70 disengages from the top wall 20 of the housing 12 when the vehicle 18 is no longer is driven so the drawer 46 is unlocked from the closed position. The lock 70 may be an electrically actuated solenoid of any conventional design.

In use, the electronic device 68 is positioned within the tray 54 before the vehicle 18 is to be driven. The electronic device 68 may not be used to text or otherwise communicate while the vehicle 18 is being driven. After the vehicle 18 is no longer being driven, the drawer 46 may be opened and the electronic device 68 may be removed from the tray 54.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An electronic device storage assembly comprising:
a housing configured to be positioned within a vehicle;
a drawer movably coupled to said housing, said drawer insertably receiving an electronic device such that the electronic device is contained within said housing; and
a lock coupled to said drawer, said lock being operationally coupled to the vehicle such that said lock detects when the vehicle is being driven, said lock selectively locking said drawer such that the electronic device is not accessible while the vehicle is being driven.

2. The electronic device storage assembly according to claim 1, further comprising said housing having a perimeter wall, said perimeter wall of said housing being structured such that a front side of said housing is open, said drawer being slidably inserted into said front side of said housing.

3. The electronic device storage assembly according to claim 2, further comprising an inner surface of each of a first lateral side and a second lateral side of said perimeter wall of said housing each having a pin groove extending toward an outer surface of said perimeter wall of said housing, said pin grooves each being coextensive with a bottom wall of said housing such that said pin grooves each extends between a center of said housing and said front side of said housing.

4. The electronic device storage assembly according to claim 3, further comprising said pin grooves each angling upwardly proximate a middle of said pin grooves such that a front end of said pin grooves is positioned proximate a top wall of said housing.

5. The electronic device storage assembly according to claim 1, further comprising a tray having a rear end and a front end, said rear end of said tray being hingedly coupled to said drawer such that said tray is positioned above said drawer.

6. The electronic device storage assembly according to claim 5, further comprising a pair of pins each coupled to and extending laterally away from said tray, each of said pins being centrally positioned on said tray.

7. The electronic device storage assembly according to claim 6, further comprising said pair of pins each slidably engaging an associated one of a pair of pin grooves such that said front end of said tray is raised upwardly from said drawer when said drawer is slid outwardly from said housing, said front end of said tray being lowered downwardly toward said drawer when said drawer is slid inwardly into said housing.

8. The electronic device storage assembly according to claim 5, further comprising said lock being coupled to and extending upwardly from said tray such that said lock is positioned proximate said rear end of said tray.

9. The electronic device storage assembly according to claim 8, further comprising said lock being electrically coupled to the vehicle such that said lock is actuated when the vehicle is driven.

10. The electronic device storage assembly according to claim 9, further comprising said lock engaging a top wall of said housing when said drawer is slid inwardly into said housing such that said drawer is locked in a closed position.

11. The electronic device storage assembly according to claim 10, further comprising said lock disengaging said top wall of said housing when the vehicle is no longer being driven such that said drawer is unlocked from said closed position, the electronic device being removable from said tray when said drawer is unlocked.

12. An electronic device storage assembly comprising:
a housing having a perimeter wall, said perimeter wall of said housing being structured such that a front side of said housing is open, said housing being configured to be positioned within a vehicle;
an inner surface of each of a first lateral side and a second lateral side of said perimeter wall of said housing each having a pin groove extending toward an outer surface of said perimeter wall of said housing, said pin grooves each being coextensive with a bottom wall of said housing such that said pin grooves each extends between a center of said housing and said front side of said housing, said pin grooves each angling upwardly proximate a middle of said pin grooves such that a front end of said pin grooves is positioned proximate a top wall of said housing;
a drawer slidably inserted into said front side of said housing;
a tray having a rear end and a front end, said rear end of said tray being hingedly coupled to said drawer such that said tray is positioned above said drawer;
a pair of pins each coupled to and extending laterally away from said tray, each of said pins being centrally positioned on said tray;
said pair of pins each slidably engaging an associated one of said pair of pin grooves such that said front end of said tray is raised upwardly from said drawer when said drawer is slid outwardly from said housing such that said tray is configured to insertably receive an electronic device, said front end of said tray being lowered downwardly toward said drawer when said drawer is slid inwardly into said housing such that the electronic device is contained within said housing;

a lock coupled to and extending upwardly from said tray such that said lock is positioned proximate said rear end of said tray, said lock being electrically coupled to the vehicle such that said lock is actuated when the vehicle is driven, the electronic device being removable from said tray when said drawer is unlocked;

said lock engaging a top wall of said housing when said drawer is slid inwardly into said housing such that said drawer is locked in a closed position, the electronic device is not accessible while the vehicle is being driven; and said lock disengaging said top wall of said housing when the vehicle is no longer being driven such that said drawer is unlocked from said closed position.

\* \* \* \* \*